(12) United States Patent
Sullivan et al.

(10) Patent No.: US 10,905,917 B2
(45) Date of Patent: *Feb. 2, 2021

(54) METHODS FOR APPLYING POLYURETHANE COATINGS TO GOLF BALLS HAVING A THERMOPLASTIC POLYURETHANE COVER AND RESULTING GOLF BALLS

(71) Applicant: Acushnet Company, Fairhaven, MA (US)

(72) Inventors: Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,389

(22) Filed: Apr. 8, 2019

(65) Prior Publication Data

US 2019/0232116 A1     Aug. 1, 2019

Related U.S. Application Data

(62) Division of application No. 15/710,866, filed on Sep. 21, 2017, now Pat. No. 10,252,113.

(51) Int. Cl.
| | | |
|---|---|---|
| *A63B 37/06* | (2006.01) | |
| *A63B 37/00* | (2006.01) | |
| *B32B 27/40* | (2006.01) | |
| *B05D 1/02* | (2006.01) | |
| *A63B 45/00* | (2006.01) | |
| *A63B 1/00* | (2006.01) | |

(52) U.S. Cl.
CPC ............ *A63B 37/0022* (2013.01); *A63B 1/00* (2013.01); *A63B 37/0023* (2013.01); *A63B 45/00* (2013.01); *B05D 1/02* (2013.01); *B32B 27/40* (2013.01)

(58) Field of Classification Search
CPC .......................... A63B 37/0022; A63B 45/00
USPC .......................................................... 473/378
See application file for complete search history.

(56) References Cited

U.S. PATENT DOCUMENTS

| | | | | |
|---|---|---|---|---|
| 5,820,491 | A | * 10/1998 | Hatch ................ | A63B 37/0003 473/378 |
| 6,063,859 | A | * 5/2000 | Yamamoto ......... | A63B 37/0003 473/351 |
| 6,100,361 | A | 8/2000 | Keller | |
| 7,131,915 | B2 | 11/2006 | Sullivan et al. | |
| 7,217,200 | B2 | 5/2007 | Matroni et al. | |

(Continued)

*Primary Examiner* — Raeann Gorden
(74) *Attorney, Agent, or Firm* — Daniel W. Sullivan

(57) ABSTRACT

Golf balls having covers made of thermoplastic polyurethane compositions are provided. Multi-piece golf balls can be made. Polyurethane primer coatings and polyurethane top-coatings are applied to the thermoplastic polyurethane cover. Different coating methods can be used. Isocyanate-rich and polyol-rich polyurethane coatings can be applied. In one embodiment, the golf ball can be treated with a multi-functional isocyanate prior to applying the coatings. The polyurethane cover composition and surface coatings can further include catalysts, ultraviolet (UV)-light stabilizers, and other additives. Heat is used to cure the coatings. The coating methods have many benefits and the finished balls have good physical properties.

7 Claims, 3 Drawing Sheets

(56) References Cited

U.S. PATENT DOCUMENTS

| | | | |
|---|---|---|---|
| 7,390,852 B2 | 6/2008 | Hayashi et al. | |
| 7,481,722 B2 | 1/2009 | Higuchi | |
| 8,920,264 B2 | 12/2014 | Kennedy, III | |
| 9,119,990 B2 | 9/2015 | Fitchett et al. | |
| 10,363,458 B2* | 7/2019 | Sullivan | A63B 37/0074 |
| 2005/0113187 A1 | 5/2005 | Marotta et al. | |
| 2005/0282660 A1 | 12/2005 | Isogawa et al. | |
| 2006/0089419 A1 | 4/2006 | Hogge et al. | |
| 2007/0142127 A1 | 6/2007 | Tarao | |
| 2008/0085783 A1 | 4/2008 | Isogawa et al. | |
| 2008/0217810 A1 | 9/2008 | Nagasawa et al. | |
| 2009/0062037 A1 | 3/2009 | Ohama et al. | |
| 2009/0247328 A1 | 10/2009 | Kamino et al. | |
| 2011/0070378 A1 | 3/2011 | Melanson et al. | |
| 2014/0274473 A1* | 9/2014 | Yontz | A63B 37/0022 473/378 |

\* cited by examiner

METHODS FOR APPLYING POLYURETHANE COATINGS TO GOLF BALLS HAVING A THERMOPLASTIC POLYURETHANE COVER AND RESULTING GOLF BALLS

CROSS-REFERENCE TO RELATED APPLICATIONS

This application is a divisional of co-assigned U.S. patent application Ser. No. 15/710,866 filed on Sep. 21, 2017, now allowed, the entire disclosure of which is incorporated by reference.

BACKGROUND OF THE INVENTION

Field of the Invention

The present invention generally relates to golf balls having covers made of thermoplastic polyurethane compositions. The golf ball includes an inner core and surrounding thermoplastic polyurethane outer cover. Multi-piece golf balls having outer cores, inner covers, and intermediate layers can be made. The invention includes methods for applying polyurethane coatings to the thermoplastic polyurethane cover. The invention also encompasses the resulting balls. The finished balls with thermoplastic polyurethane covers and surface polyurethane coatings have many advantageous physical and playing performance properties.

Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

Three-piece, four-piece, and even five-piece balls have become more popular over the years. More golfers are playing with these multi-piece balls for several reasons including new manufacturing technologies, lower material costs, and desirable ball playing performance properties. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a single or multi-layered cover to provide a final ball assembly. Different materials are used in these golf ball constructions to impart specific properties and playing features to the ball.

For instance, in recent years, there has been high interest in using polyurethane compositions to make golf ball covers. Basically, polyurethane compositions contain urethane linkages formed by reacting an isocyanate group (—N═C═O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents.

In Sullivan et al., U.S. Pat. No. 5,971,870, thermoplastic or thermosetting polyurethanes and ionomers are described as being suitable materials for making outer cover and any inner cover layer. The cover layers can be formed over the cores by injection-molding, compression molding, casting or other conventional molding techniques. Preferably, each cover layer is separately formed. In one embodiment, the inner cover layer is first injection molded over the core in a cavity mold, subsequently any intermediate cover layers are injection molded over the inner cover layer in a cavity mold, and finally the outer cover layer is injection molded over the intermediate cover layers in a dimpled cavity mold.

In Sullivan et al., U.S. Pat. No. 7,131,915, the outer cover can be made from a polyurethane composition and various aliphatic and aromatic diisocyanates are described as being suitable for making the polyurethanes. Depending on the type of curing agent used, the polyurethane composition may be thermoplastic or thermoset in nature. Sullivan '915 further discloses that compositions for the intermediate cover layer and inner cover layer may be selected from the same class of materials as used for the outer cover layer. In other embodiments, ionomers such as HNPs, can be used to form the intermediate and inner cover layers. The castable, reactive liquid used to form the urethane elastomer material can be applied over the core using a variety of techniques such as spraying, dipping, spin coating, or flow coating methods.

As discussed above, both thermoplastic and thermosetting polyurethanes can be used to form golf ball covers. Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the theremoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

One advantage with using thermoplastic polyurethane compositions to form golf ball covers is that they have good processability. The thermoplastic polyurethanes generally have good melt-flow properties and different molding methods may be used to form the covers. Although thermoplastic polyurethane covers for golf balls have been used over the years, there are drawbacks with using some thermoplastic polyurethanes materials. For example, one drawback with some thermoplastic polyurethanes is they may not be as durable and tough as other polymers. For example, the resulting thermoplastic polyurethane cover may not have high mechanical strength, impact durability, and cut and scuff (groove shear)-resistance.

Thus, manufacturers have used various methods of treating thermoplastic polyurethanes to enhance the durability and strength of the polymer. For example, an isocyanate may be compounded into a masterbatch and then the masterbatch may be added to the thermoplastic polyurethane composition prior to molding. In another example, the molded thermoplastic polyurethane cover may be dipped into an isocyanate solution. Treating the thermoplastic polyurethane material with isocyanates helps improve the physical properties such as mechanical strength, impact durability, and cut and scuff (groove shear)-resistance of the material. In some cases, the physical properties may not only increase, but they may actually increase beyond the values of the non-refined material.

For example, Kennedy, III, U.S. Pat. No. 8,920,264 and Matroni, U.S. Pat. No. 9,119,990 disclose isocyanate dipping methods, whereby a golf ball having a thermoplastic polyurethane cover is treated with a solution of isocyanate. The isocyanate solution can contain a solvent, for example, acetone or methyl ethyl ketone (MEK), at least one isocyanate compound, and a catalyst. The ball is soaked in the isocyanate solution and this causes the isocyanate compound to permeate the cover. The isocyanate compound cross-links the thermoplastic polyurethane cover material, and this improves the physical properties of the cover such as durability and scuff-resistance.

One drawback with using conventional isocyanate treatment methods is they typically require additional steps in the manufacturing process and they may not be very cost-effective. These additional steps may be time-consuming and reduce process efficiency. In view of some of the drawbacks with some of these methods, it would be desirable to have new, cost-effective, efficient methods that can produce golf balls with desirable physical and playing performance properties. The present invention provides new methods for making thermoplastic polyurethane covers for golf balls having many advantageous features and benefits. The invention also includes the resulting golf balls having good physical and playing performance properties.

SUMMARY OF THE INVENTION

The present invention generally relates to golf balls having covers made of thermoplastic polyurethane compositions. The invention includes methods for applying polyurethane coatings to the thermoplastic polyurethane cover. In one embodiment, a method for forming a coated golf ball comprises the steps of: a) providing a golf ball comprising at least one core layer and an outer cover layer, wherein the outer cover layer is formed from a thermoplastic polyurethane composition; b) applying a first polyurethane coating comprising unreacted isocyanate groups and having an isocyanate index of at least about 115 to the outer cover layer; c) treating the golf ball with heat; and d) applying a second polyurethane coating to the outer cover of the golf ball to form a coated golf ball. In a second embodiment, the second polyurethane coating has an isocyanate index of less than 96. The first and second polyurethane coatings can be applied by spray-coating. Also, the outer surface of the golf ball can be heated with a source of infrared heat, preferably to a surface temperature in the range of about 120° to 150° F.

Preferably, at least one of the first and second polyurethane coatings comprises a catalyst. The thermoplastic polyurethane composition also may comprise a catalyst. Suitable catalysts include, for example, those selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate, and.

In one embodiment, the outer cover layer has a thickness in the range of about 0.010 to about 0.050 inches and hardness in the range of about 20 to about 59 Shore D. The golf ball may include an inner core and outer core layer. The golf ball also may include an inner cover layer.

In another embodiment, the steps comprise: a) providing a golf ball having an outer cover layer formed from a thermoplastic polyurethane composition; b) applying a mixture comprising multi-functional isocyanate and solvent to the outer cover layer; c) applying a first polyurethane coating comprising unreacted isocyanate groups and having an isocyanate index of at least about 115 to the outer cover layer; c) treating the golf ball with heat; and d) applying a second polyurethane coating to the outer cover of the golf ball to form a coated golf ball. In another embodiment, the first polyurethane coating is not over-indexed. For example, the first polyurethane coating can have an isocyanate index of less than 96. The mixture applied to the outer cover layer can comprise a multi-functional isocyanate, ultraviolet (UV) light stabilizer, and solvent.

In yet another embodiment, the first polyurethane coating comprises a mixture of 1,6-hexamethylene diisocyanate (HDI); 4,4'-dicyclohexylmethane diisocyanate ($H_{12}$ MDI); and 4,4'-methylene diphenyl diisocyanate (MDI); and solvent. Suitable solvents include, for example, ketones, acetates, and mixtures thereof. The invention also includes the balls made from the above-described methods. The finished balls have many advantageous physical and playing performance properties.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
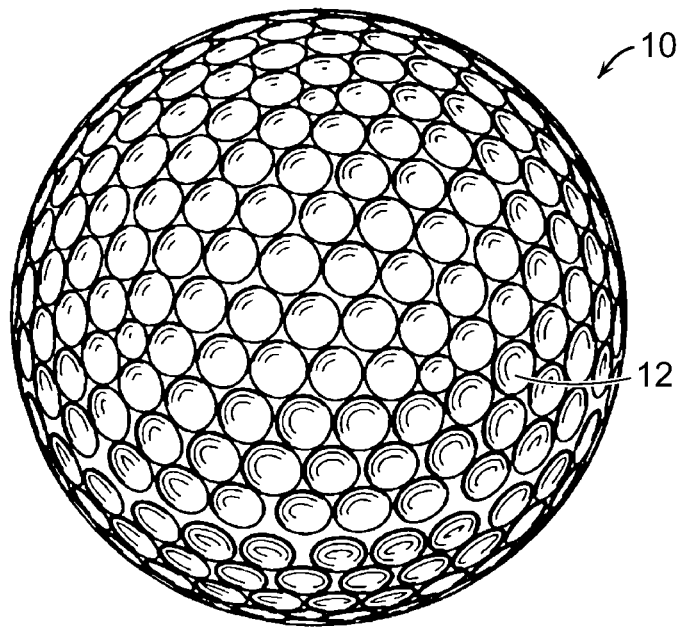
FIG. 1 is a perspective view of a dimpled golf ball made in accordance with the present invention.

The present invention relates generally to golf balls having covers made of thermoplastic polyurethane (TPU) compositions. Different polyurethane primer and top-coats are applied to the polyurethane outer cover in accordance with this invention. The invention also includes the finished golf balls made from these coating applications.

Golf balls having various constructions may be made in accordance with this invention. For example, golf balls having three piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a two-piece golf ball containing a core and having a surrounding cover is made. Three-piece golf balls containing a dual-layered core and single-layered cover also can be made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball as discussed further below.

Core Structure

The golf ball may contain a single- or multi-layered core. In one preferred embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions are discussed in further detail below.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD 1040 | 0.855 | 135 | 60 |
| HPF AD1172 | 0.800 | 32 | 37 |

Cover Layer Structure

The golf balls of this invention further include an outer cover layer made of a thermoplastic polyurethane composition. In general, polyurethanes contain urethane linkages formed by reacting an isocyanate group (—N=C=O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the theremoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3T-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid.

The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

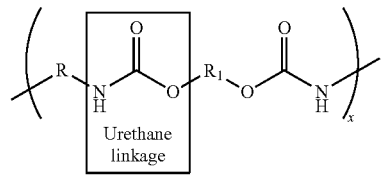

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

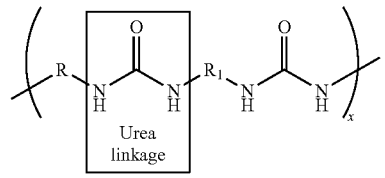

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Intermediate Layers

In one preferred embodiment, an intermediate layer is disposed between the single or multi-layered core and surrounding cover layer. These intermediate layers also can be referred to as casing or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ $\alpha$, $\beta$-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred $\alpha$, $\beta$-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$$\alpha,\beta$-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ $\alpha$, $\beta$-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the intermediate layer include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core and intermediate layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure of thermoplastic can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

Golf Ball Construction

The solid cores for the golf balls of this invention may be made using any suitable conventional technique such as, for example, compression or injection-molding. Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball sub-assembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

Application of Primer and Top-Coats

After the golf balls have been removed from the mold, they may be subjected to finishing steps such as flash-trimming, surface-treatment, marking, and application of coatings in accordance with this invention.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

In one embodiment, a first (primer) polyurethane coating comprising unreacted isocyanate groups and having an isocyanate index of at least about 115 is applied to the outer cover. The golf ball is then preferably treated with heat so the coating is at least partially-cured. For example, the golf ball can be heated preferably to a surface temperature of at least about 105° to about 200° F. Preferably, the golf ball is heated to a surface temperature of about 120° to about 150° F. Preferably, the golf ball is then heated for at a period of 2 minutes to about 240 minutes, more preferably a period of 4 minutes to 120 minutes, and most preferably about 8 minutes to 60 minutes. In a third step, a second (top-coat) polyurethane coating is applied to the outer cover. Any suitable coating technique may be used to apply the first and second polyurethane coatings. For example, spraying, dipping, brushing, or rolling methods can be used. Then the golf ball can go through a series of finishing steps.

In a second embodiment, a first (primer) polyurethane comprising unreacted isocyanate groups and having an isocyanate index of at least about 115 is applied to the outer cover and the golf ball is treated with heat as described above. In a third step, a second (top-coat) polyurethane coating having an isocyanate index of less than 96 is applied to the outer cover.

In a third embodiment, a first (primer) polyurethane comprising unreacted isocyanate groups and having an isocyanate index of at least about 115 and further comprising a catalyst is applied to the outer cover and the golf ball is treated with heat as described above. In a third step, a second (top-coat) polyurethane coating is applied to the outer cover as described above. The thermoplastic polyurethane composition of the outer cover layer and second (top-coat) polyurethane coatings also may comprise catalysts. Suitable catalysts include, for example, dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate, and mixtures thereof.

In a fourth embodiment, a mixture comprising a multi-functional isocyanate and solvent is applied to the outer cover and the golf ball is treated with heat as described above. The mixture also may contain additives such as, for example, ultraviolet (UV) light stabilizers. A first (primer) polyurethane coating that may be over-indexed or under-indexed may be applied to the outer cover. For example, the mixture may be over-indexed and comprise unreacted isocyanate groups and have an isocyanate index of at least about 115. In another example, the mixture may be under indexed and have an isocyanate index of less than 96. The golf ball is treated with heat as described above. A second polyurethane top-coating having an isocyanate index that is over-indexed or under-indexed may be applied. This treatment of the outer cover layer with isocyanates further enhances cross-linking and improves cover durability. These isocyanates can function as cross-linkers in the thermoplastic polyurethane cover. The chain length of the thermoplastic polyurethane is extended and thus the molecular weight of the polyurethane is increased when treated with the multi-functional isocyanates.

Preferably, the multi-functional isocyanate compound is selected from the group consisting of toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. More preferably, the polyisocyanate is selected from the group consisting of 4,4'-methylene diphenyl diisocyanate (MDI), 2,4'-methylene diphenyl diisocyanate (MDI), toluene 2,4-diisocyanate (TDI), toluene 2,6-diisocyanate (TDI), 4,4'-dicyclohexylmethane diisocyanate ("$H_{12}$ MDI"), p-phenylene diisocyanate (PPDI), and isophorone diisocyanate (IPDI), and homopolymers and copolymers and blends thereof.

The solvent may be any solvent that forms a solution with the multi-functional isocyanate and allows for some level of penetration of the isocyanate into the thermoplastic polyurethane substrate to which it is applied. Suitable solvents include, for example, toluene, xylene, naphthalene, ketones, and acetates. Preferably, the solvent comprises one selected from the group consisting of acetone, methyl ethyl ketone, methyl amyl ketone, dimethyl heptanone, methyl pentanone, methyl isobutyl ketone, cyclohexanone, methyl acetate, ethyl acetate, and butyl acetate, and mixtures thereof. The mixture preferably comprises from about 1 to 25 wt. % isocyanate, and more preferably about 2 to 20 wt. %, and most preferably 5 to 18 wt % isocyanate.

Polyurethane Coatings and Isocyanate Index

Generally, the polyurethane coating material may be a two-part coating system. A preferred coating system includes (1) a first part comprising a polyol or another compound containing an active hydrogen atom, and (2) a second part comprising a polyisocyanate (or polyisocyanurate) with at least two —N═C═O groups.

Suitable polyols for the polyurethane coating system include both polyether and polyester polyols. In one particular embodiment, the polyol may be a hydroxyl functional polyol having a hydroxyl equivalent weight in the range of from about 50 to about 1500, or an hydroxyl equivalent weight being in the range of from about 200 to about 800. Suitable polyesters for use herein include poly (oxydiethylene adipates) that are condensation products of diethylene glycol and adipic acid, branched with trimethylolpropane or pentaerythritol, and polycaprolactone (hydroxycaproic acid) polyesters.

Suitable polyethers include polymers of propylene oxide or propylene oxide/ethylene oxide. Such materials are usually triols or diols with molecular weights between 1000 and 7000. Suitable examples of polyols include Desmophen® 651A-65, 800, 670A-80, 680-70 and 631A-75, which are saturated polyester resins, commercially available from Bayer Corp.

As mentioned above, in addition to a polyol, the two-part polyurethane system also comprises a polyisocyanate (or polyisocyanurate) with at least two —N═C═O groups, carried in a solvent. Various diisocyntes, including but not limited to hexamethylene diisocyanate (HDI), methylene diisocyanate (MDI), toluene diisocyanate (TDI), and isophorone diisocyanate (IPDI) may be used. In particular embodiments, aliphatic isocyanates may be used. HDI derivatives contemplated for use herein are sold by Bayer Corp. under the trademark, Desmodur™. One such composition is Desmodur™ N-3200, which is a low viscosity biuret of HDI.

The polyisocyanate used herein may have an equivalent weight within the range of from about 100 to about 1,200, or from about 150 to about 300 in some embodiments. The polyisocyanate may be carried in a solvent, with the solvent solution containing from a minimum of about 40%, alternatively about 60%, alternatively about 70%, to a maximum of approaching 100%, and in particular about 85%, by weight of the polyisocyanate.

Suitable solvents for the polyisocyanate include methyl isobutyl ketone, methyl amyl ketone, methyl isoamyl ketone, butyl acetate and propylene glycol monomethyl ether acetate, or mixtures thereof. In a particularly embodiment, the solvent is present in an amount of 20-65 weight %, or in amount of 40-60 weight % based upon the total weight of the coating system. Urethane grade solvents (i.e. low-moisture solvents) may be used in particular embodiments.

The polyurethane coating material may also be formed from a polyurethane system that includes a catalyst. Generally, the catalyst increases the rate of curing. The catalyst may comprise at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate.

The catalyst may be present in a quantity of 0.01-10 weight active catalyst (not including any carrier) based on total resin solids (polyol plus polyisocyanate, excluding solvents). The quantity of catalyst will depend upon the type of catalyst, polyol, polyisocyanate, and solvents which are used, as well as the curing temperature and desired curing time. For example, when dibutyl tin dilaurate is used as the catalyst, it preferably is present in an amount of about 0.05-0.35 weight % active catalyst based upon total resin solids, and more preferably 0.08-0.15 weight % based upon total resin solids. Generally, the catalyst preferably is present in an amount sufficient to reduce the curing time of the coating as compared to a coating system which does not contain the catalyst but is otherwise identical.

Any aromatic or aliphatic or blend thereof may be used including polyisocyanates. Preferred examples of the isocyanate component in the polyurethane include: aromatic polyisocyanates such as 2,4-toluene diisocyanate, 2,6-toluene diisocyanate, mixtures of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI) and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI) and isophorone diisocyanate (IPDI); and aliphatic polyisocyanates such as hexamethylene diisocyanate (HDI). Two or more polyisocyanates may be used in combination. In light of the weather resistance, TMXDI, XDI, HDI, $H_6$XDI, IPDI and $H_{12}$MDI are preferred.

As also noted herein, it has been discovered that as the melt index of a polymer increases, some of the physical properties of the polymer decrease. As a result, in the more preferred embodiments of the invention the high melt index golf ball components are further treated with a liquid isocyanate solution. By performing an isocyanate post-molding treatment process to the golf ball, the physical properties of the thermoplastic polyurethane, polyurea or polyurethane/polyurea cover material may not only increase, but may increase beyond the values of the non-refined material. This physical property improvement yields a significant improvement in golf ball durability, namely improved cut and scuff (groove shear) resistance.

This post-application of isocyanate is believed to allow for the use of relatively high melt index thermoplastic polyurethane, polyurea or polyurethanes/polyureas to be used in conventional injection molding machines and/or in reaction injection molding ("RIM") equipment to mold thin wall layers, i.e. 0.075 inches, more preferably 0.050 inches and below, preferably 0.040 inches and below, more preferably 0.030 inches and below, and most preferably 0.025 inches and below. The molded thin-walled golf balls are preferably dipped in an isocyanate solution for 1 to 10 minutes (preferably 1 to 5 minutes); the isocyanate may be aliphatic or aromatic, such as HDI, IPDI, MDI, TDI type or others as discussed below and the isocyanate solution may range from 10 to 100% solids. The solvent used to reduce the solids and make the isocyanate solutions may be a ketone or acetate or any solvent that will allow penetration of the isocyanate into the cover material without distorting the cover. After dipping, the balls are air-dried for 1 hour and then post-cured at 175° F. for 4 hours. After the post-cure the balls may be cleaned with isopropanol to remove any excess isocyanate from the cover and the balls are then finished in a normal manner. Preferably, the isocyanate used is of the MDI type at 15-30% solids reduced with a ketone (such as Mondur ML™ from Bayer Corporation) and dipped for 2-3 minutes. Most preferably, the solids level is about 16 to 24% (20.+−0.4). It is beneficial that the MDI remain in a liquid state at room temperature. However, this method shall not be limited to the type of polyurethane, polyurea or polyurethane/polyurea material, isocyanate used, concentration of the isocyanate solution, solvent used, dip time, or method of application described above.

Isocyanate Indexing:

In some embodiments, the cross-linking may take place as a result of the relative proportions of isocyanate functional groups in the cover layer and the coating layer. As is generally known, polyurethanes (whether thermoplastic or thermoset) are polymerized through the reaction between an isocyanate functional group on a polyisocyanate and a hydroxyl functional group on a polyol. The relative stoichiometric amounts of each of these functional groups is expressed as the "isocyanate index" of the polyurethane system. Namely, the isocyanate index may be expressed as the ratio of the number of isocyanate groups present in the polyurethane system to the number of hydroxyl groups times 100. Or, in other words, the isocyanate index may be expressed as the ratio of the actual number of isocyanate functional groups present in the polyurethane system to the hypothetical number of isocyanate functional groups necessary to fully react with all of the hydroxyl groups present in the polyurethane system.

The isocyanate index may also be referred to as the "NCO index." The location of the decimal place may vary based on common convention (i.e. the value of the isocyanate index may be equally expressed as 1.00 or 100 depending on colloquialism). As used herein, an isocyanate index value of 100 means that the number of isocyanate functional groups present in the polyurethane system is equal to the number of hydroxyl functional groups present in the polyurethane system. An isocyanate index value of less than 100 means that excess hydroxyl groups are present, and an isocyanate index value of greater than 100 means that excess isocyanate groups are present.

In certain embodiments, the isocyanate index of the coating layer may be different from the isocyanate index of the cover layer. Particularly, the isocyanate index of the coating layer may differ from 100 by a first certain amount, the isocyanate index of the cover layer may different from 100 by a second certain amount, where one of the isocyanate index values is above 100 and the other is below 100. More specifically, the isocyanate index of the coating layer may be at least a first predetermine amount above 100, while the isocyanate index of the cover layer may be at least a second predetermine amount below 100. The first predetermined amount and the second predetermined amount may be the same or different. In other embodiments, the isocyanate index of the coating layer may be at least a first predetermine amount below 100, while the isocyanate index of the cover layer may be at least a second predetermined amount above 100.

It should be understood that the different embodiments for coating the golf balls as described above are for illustrative purposes only and not meant to be restrictive. Other embodiments include, for example, a process where the molded TPU golf ball is first sprayed with a polyurethane primer further containing an excess of isocyanate (over-indexed) by at least 105 or more, and more preferably by 110 or more. After drying (evaporation of solvent) and cure of both the PU primer and at least a portion of the TPU outermost skin, a second step of applying a PU topcoat is performed. A preferred means of drying and curing in all golf ball coating embodiments is via Infrared heat.

In a second example, the molded TPU golf ball is first sprayed with a polyurethane primer further containing an excess of isocyanate (over-indexed) by at least 105 or more, and more preferably by 110 or more. After drying (evaporation of solvent) and cure of both the PU primer and at least a portion of the TPU outermost skin, a second step of applying a PU topcoat which is under-indexed occurs. The polyol rich PU topcoat will react with any unreacted Isocyanate leftover from the over-indexed prime-coat. The topcoat is under-indexed to 98 or less, and preferably 95 or less.

In a third example, the molded TPU golf ball is first sprayed with a simple solution of isocyanate in a solvent. After an appropriate drying/reacting time and temperature, a PU prime coat (which may or may not be over-indexed) is applied followed by the application of a PU top-coat (which may or may not be under-indexed).

In a fourth example, the molded TPU golf ball is first sprayed as described above in Examples 1, 2, or 3, except that a reaction enhancing catalyst is added to any coating. Such a catalyst promoted the reaction of isocyanate and TPU and also ensures reaction of nearly all, preferably all, of the excess isocyanate present in the golf ball cover and/or coating layers. The catalyst may comprise at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate.

Prior to the application of any coating it may be desirable to heat the golf ball to enhance/improve the ability of the isocyanate in the coating to react with the TPU. Infrared (IR) heat may be an ideal way to quickly warm the cover layer. A warm coating may also improve the reaction/reaction rate.

Prior to spraying the golf ball with any coating any number of pre-treatments may be used to effect greater/higher degree of cross-linking between the isocyanate and TPU such as: a) spray/dipping the TPU ball with solvent only; b) corona or plasma treatment of the TPU ball; c) adding catalyst to the TPU composition; d) adding isocyanate/isocyanate masterbatch to the TPU composition; e) adding antioxidant/antiozonant, HALS, UV absorber, and the like to the TPU composition or any TPU coating layer; f) under-indexing the TPU composition to a polyol rich index to provide more sites for subsequent reaction with the isocyanate; g) adding unsaturated reactive sites to the TPU (e.g., diene) for free-radical crosslinking that would ultimately combine a variety of crosslinks to the TPU cover. Such means of free radical crosslinking would be radiation (gamma, e-beam) or if a peroxide or other initiator is added to the TPU in bulk or via solution treatment, heat could then be used to cross-link the composition.

Thickness and Hardness of Golf Balls

The golf balls of this invention provide the ball with a variety of advantageous mechanical and playing performance properties as discussed further below. In general, the hardness, diameter, and thickness of the different ball layers may vary depending upon the desired ball construction. If the ball includes an intermediate layer or inner cover layer, the hardness (material) is about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 65 Shore D or less, or 55 Shore D or less, or 50 Shore D or less, or 50 Shore D or less, or 45 Shore D or less. Preferably, the outer cover has hardness in the range of about 20 to about 59 Shore D. In one example, the outer cover has hardness in the range of about 25 to about 55 Shore D.

The method of this invention is particularly effective in providing golf balls having a thin outer cover layer. Furthermore, the method of this invention provides thin outer covers with substantially uniform thickness. The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (COR) of at least 0.750 and more preferably at least 0.800 (as measured per the test methods below.) The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

Referring to FIG. 1, a front view of a finished golf ball that can be made in accordance with this invention is generally indicated at (10). The dimples (12) may have various shapes and be arranged in various patterns to modify the aerodynamic properties of the ball.

Figure 2:
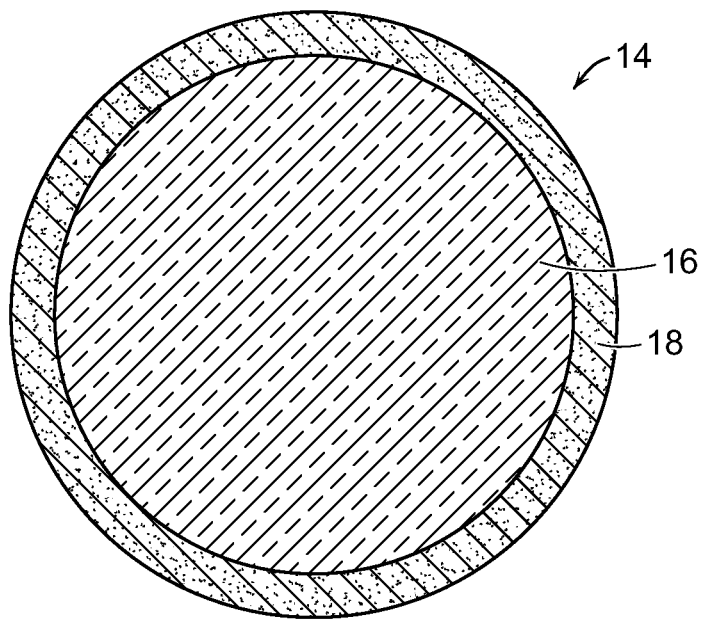
FIG. 2 is a cross-sectional view of a two-piece golf ball having an inner core and outer cover made in accordance with the present invention.
Figure 3:
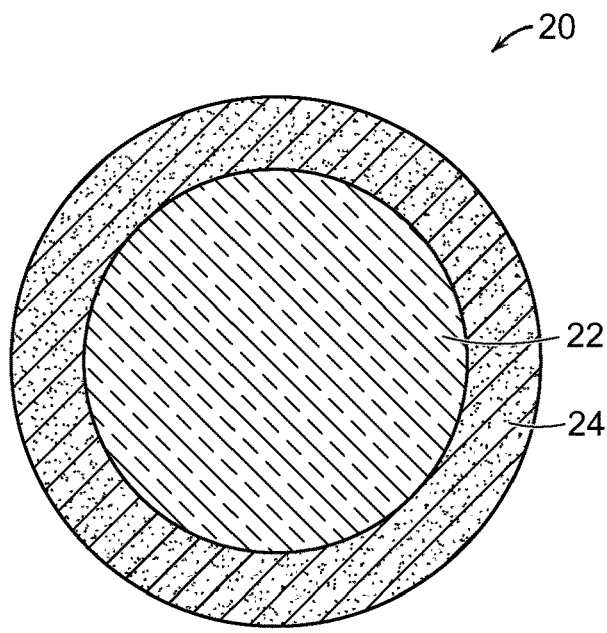
FIG. 3 is a cross-sectional view of another two-piece golf ball having an inner core and outer cover made in accordance with the present invention.
Figure 4:
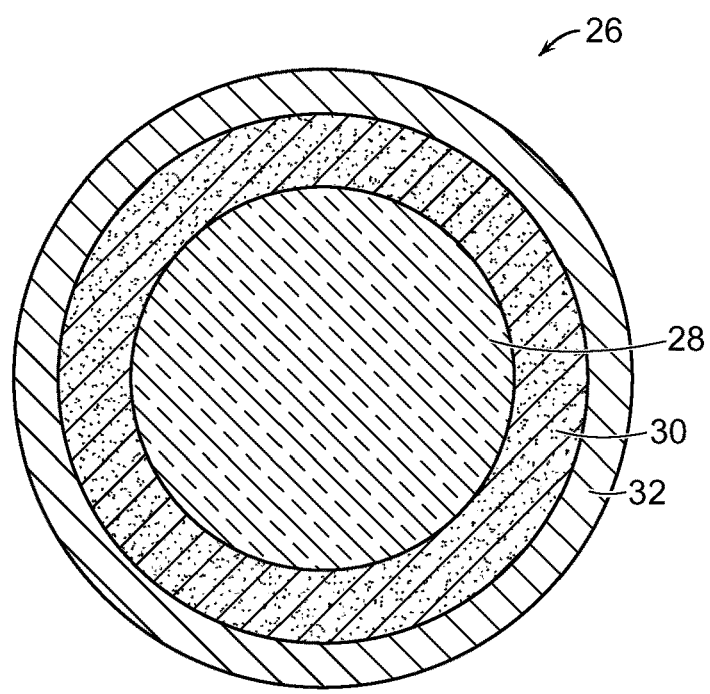
FIG. 4 is a cross-sectional view of a three-piece golf ball having an inner core, outer core, and outer cover made in accordance with the present invention.

As shown in FIG. 2, a two-piece golf ball (14) can be made having a core (16) and a surrounding thermoplastic polyurethane outer cover layer (18). In the golf ball (14), the core (16) has a relatively large diameter and the outer cover (18) has a relatively small thickness. Referring to FIG. 3, in another embodiment, a two-piece golf ball (20) having a smaller core (22) and a thicker outer cover layer (24) can be made. Turning to FIG. 4, a three-piece golf ball (26) is made, wherein the dual-layered core (inner core (28) and outer core layer (30) is surrounded by a single-layered thermoplastic polyurethane cover (32).

Figure 5:
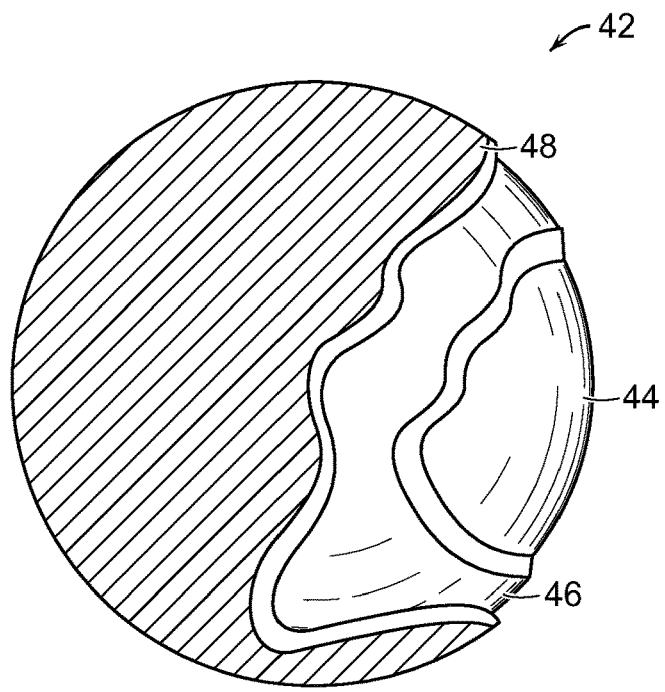
FIG. 5 is a partial cut-away perspective view of a three-piece golf ball having an inner core, outer core, and outer cover made in accordance with the present invention.
Figure 6:
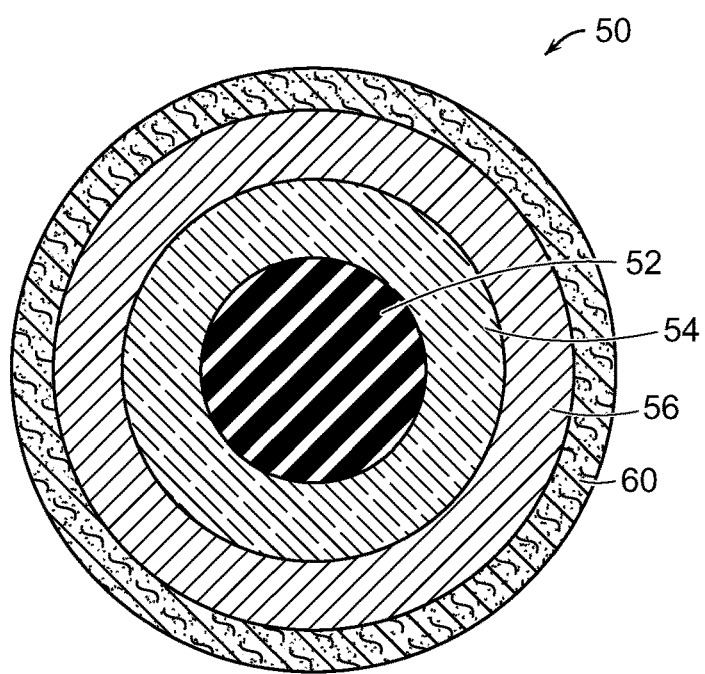
FIG. 6 is a cross-sectional view of a four-piece golf ball having an inner core, outer core, inner cover, and outer cover made in accordance with the present invention.

In FIG. 5, a partial cut-away view of a three-piece golf ball (42) having an inner core (44), outer core (46) and surrounding thermoplastic polyurethane cover (48) is shown. Finally, in FIG. 6, a four-piece ball (50) containing a dual-core having an inner core (52) and outer core layer (54) is shown. The dual-core is surrounded by a multi-layered cover with an inner cover layer (56) and thermoplastic polyurethane outer cover (60).

It should be understood that the golf balls shown in FIGS. 1-6 are for illustrative purposes only, and they are not meant to be restrictive. Other golf ball constructions can be made in accordance with this invention.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core×amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("COR").

The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

We claim:

1. A coated golf ball formed by a method, the method comprising the steps of:
providing a golf ball comprising at least one core layer and an outer cover layer, wherein the outer cover layer is formed from a thermoplastic polyurethane composition;
applying a mixture comprising multi-functional isocyanate and solvent to the outer cover layer;

applying a first polyurethane coating comprising unreacted isocyanate groups and having an isocyanate index of at least about 115 to the outer cover layer;
treating the golf ball with heat; and
applying a second polyurethane coating to the outer cover of the golf ball to form a coated golf ball.

2. The golf ball of claim 1, wherein the isocyanate is selected from the group consisting of 4,4'-methylene diphenyl diisocyanate (MDI), 2,4'-methylene diphenyl diisocyanate (MDI), toluene 2,4-diisocyanate (TDI), toluene 2,6-diisocyanate (TDI), 4,4'-dicyclohexylmethane diisocyanate ($H_{12}$ MDI), p-phenylene diisocyanate (PPDI), and isophorone diisocyanate (IPDI), and homopolymers and copolymers and blends thereof.

3. The golf ball of claim 1, wherein the solvent is selected from the group consisting of ketones, acetates, and mixtures thereof.

4. The golf ball of claim 1, wherein the mixture further comprises an ultraviolet (UV) light stabilizer.

5. The golf ball of claim 1, wherein at least one of the first and second polyurethane coatings further comprises a catalyst.

6. The golf ball of claim 1, wherein the thermoplastic polyurethane composition further comprises a catalyst.

7. The golf ball of claim 6, wherein the catalyst is selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diazo compounds, and potassium acetate, and mixtures.

\* \* \* \* \*